US010936777B1

(12) United States Patent
Gao et al.

(10) Patent No.: US 10,936,777 B1
(45) Date of Patent: Mar. 2, 2021

(54) UNIFIED IMPROVEMENT SCORING CALCULATION FOR REBUFFERING AN INTEGRATED CIRCUIT DESIGN

(71) Applicant: Cadence Design Systems, Inc., San Jose, CA (US)

(72) Inventors: Jhih-Rong Gao, Austin, TX (US); Yi-Xiao Ding, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/777,661

(22) Filed: Jan. 30, 2020

(51) Int. Cl.
  *G06F 30/00* (2020.01)
  *G06F 30/337* (2020.01)
  *G06F 30/392* (2020.01)
  *G06F 30/31* (2020.01)
  *G06F 30/396* (2020.01)
  *G06F 30/3312* (2020.01)

(52) U.S. Cl.
  CPC .......... *G06F 30/337* (2020.01); *G06F 30/31* (2020.01); *G06F 30/392* (2020.01); *G06F 30/396* (2020.01); *G06F 30/3312* (2020.01)

(58) Field of Classification Search
  CPC ...... G06F 30/337; G06F 30/396; G06F 30/31; G06F 30/3312; G06F 30/392
  See application file for complete search history.

(56) References Cited

U.S. PATENT DOCUMENTS

| 5,619,418 A * | 4/1997 | Blaauw | G06F 30/327 716/113 |
| 6,230,304 B1 * | 5/2001 | Groeneveld | G06F 30/327 716/113 |
| 6,446,239 B1 * | 9/2002 | Markosian | G06F 30/392 716/122 |
| 7,168,057 B2 * | 1/2007 | Drumm | G06F 30/327 716/114 |

(Continued)

OTHER PUBLICATIONS

Shi, Weiping, "A Fast Algorithm for Optimal Buffer Insertion", IEEE Transactions on Computer-Aided Design of Integrated Circuits and Systems, 24(6), (Jun. 2005), pp. 879-891.

(Continued)

*Primary Examiner* — Naum Levin
(74) *Attorney, Agent, or Firm* — Schwegman Lundberg & Woessner, P.A.

(57) ABSTRACT

Aspects of the present disclosure address improved systems and methods for rebuffering an integrated circuit (IC) design using a unified improvement scoring algorithm. A plurality of rebuffering candidates are generated based on an initial buffer tree in an integrated circuit (IC) design. A rebuffering candidate in the plurality of rebuffering candidates comprises a modified buffer tree based on the initial buffer tree. A buffering cost of each rebuffering candidate is determined. A reference buffer tree is selected from among the rebuffering candidates based on the buffering cost of each rebuffering candidate. An improvement score of each rebuffering candidate is determined based on the buffering cost of each rebuffering candidate relative to the reference buffer tree. A (Continued)

new buffer tree is selected from among the plurality of rebuffering candidates to replace the initial buffer tree based on the improvement score of each rebuffering candidate.

20 Claims, 6 Drawing Sheets

(56) References Cited

U.S. PATENT DOCUMENTS

| | | | | |
|---|---|---|---|---|
| 7,653,884 | B2* | 1/2010 | Furnish | G06F 30/392 |
| | | | | 716/103 |
| 7,676,780 | B2* | 3/2010 | Alpert | G06F 30/39 |
| | | | | 716/114 |
| 7,877,719 | B2* | 1/2011 | He | G06F 30/327 |
| | | | | 716/114 |
| 8,104,012 | B1* | 1/2012 | Klein | G06F 30/327 |
| | | | | 716/132 |
| 8,392,861 | B2* | 3/2013 | Shibatani | G06F 30/3312 |
| | | | | 716/114 |
| 9,223,918 | B2* | 12/2015 | Kartschoke | G06F 30/30 |
| 10,089,426 | B2* | 10/2018 | Isshiki | G06F 30/327 |
| 2002/0124230 | A1* | 9/2002 | Cai | G06F 30/327 |
| | | | | 716/114 |

OTHER PUBLICATIONS

Van Ginneken, Lukas P.P.P., "Buffer Placement in Distributed RC-tree Networks for Minimal Elmore Delay", IEEE International Symposium on Circuits and Systems, (1990), pp. 865-868.

* cited by examiner

UNIFIED IMPROVEMENT SCORING CALCULATION FOR REBUFFERING AN INTEGRATED CIRCUIT DESIGN

TECHNICAL FIELD

The present disclosure generally relates to the technical field of integrated circuit design. In particular, the present disclosure addresses systems and methods for a unified improvement scoring calculation for rebuffering an integrated circuit design.

BACKGROUND

An integrated circuit (IC) comprises cells of similar and/or various sizes, and connections between or among the cells. A cell includes several pins interconnected by wires to pins of one or more other cells. A net includes a set of pins connected by wires in order to form connections between or among the pins. An IC design may include multiple nets. A design netlist specifies the connections between the pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In addition to circuit partitioning, floor planning, placement and routing, a typical EDA IC design process may include one or more optimization operations during which design objectives such as slew, timing, power, and other considerations are improved. Optimization often involves rebuffering. With rebuffering, buffers and inverters may be replaced with other buffers of various sizes or locations to optimize design objectives. As an example, an existing buffer set may be partially removed and a new buffer set may be inserted into a design during an optimization operation. Generally, rebuffering optimizations often include evaluating multiple buffer solutions (e.g., multiple buffer trees) using a scoring algorithm such as a return on investment (ROI) algorithm that indicates a measure of improvement provided by each buffering solution. Conventional ROI algorithms calculate this score by dividing the difference between the objective of the initial solution (e.g., slew, timing, power, or a combination thereof) and the objective of the new solution with the difference between the buffering cost of the new solution (e.g., total area, buffer counts, or total power) with the cost of the buffering solution. As an example, the following formula may be used:

$$ROI = \frac{\Delta \text{Objective}}{\Delta \text{Cost}} = \frac{newObjective - initialObjective}{newBufferTreeCost - initialBufferTreeCost}$$

Typically, the buffer tree with the highest score (e.g., the highest ROI) is selected to replace an existing buffer tree. That is, the best buffering candidate is identified by finding the maximum positive score of all candidate solutions. However, in instances in which a new solution has a smaller buffering cost than the existing buffer tree, a negative score (e.g., a negative ROI) for the new solution is calculated, which means that this solution will not be selected.

Aspects of the present disclosure address problems with the conventional approaches to rebuffering in electronic design automation (EDA), among others, with a design process that includes a unified improvement score calculation for rebuffering an IC design. Consistent with some embodiments, rather than calculating a improvement score such as an ROI based on an initial buffer tree as described above, the unified quality scoring calculation described herein involves selection of a reference buffer tree from rebuffering candidates and calculating a improvement score (e.g., an ROI) of the rebuffering candidates relative to the reference buffer tree. The selection of the reference buffer tree is based on buffering costs of the rebuffering candidates. More specifically, the rebuffering candidate with the lowest buffering cost may be selected as a reference buffer tree. Given that the reference buffer tree has the lowest buffering cost, a improvement score can be computed for each rebuffering candidate without encountering a negative difference between costs thereby allowing the best candidate to be identified by finding the rebuffering candidate with the highest positive improvement score (e.g., highest ROI).

Figure 1:
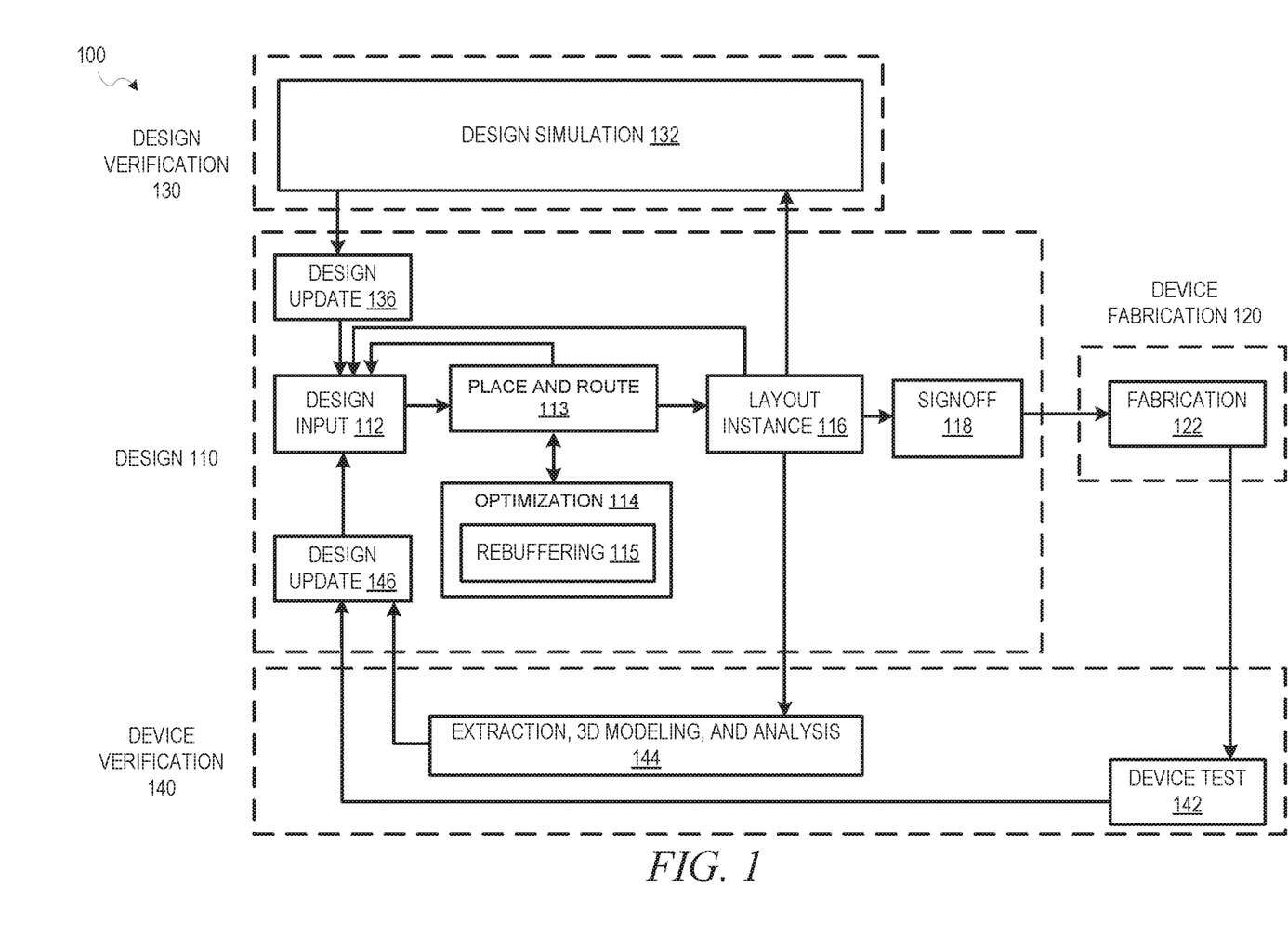
FIG. 1 is a diagram illustrating an example design process flow that includes a unified improvement score calculation for rebuffering an integrated circuit design, according to some embodiments.

FIG. 1 is a diagram illustrating an example design process flow 100 that includes a minimum-area layer assignment process to improve timing in an IC design, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, placement, and timing analysis are performed in a place and route 113 operation, and optimization is performed in a optimization 114 operation along with any other automated design processes. While the design process flow 100 shows place and route 113 and optimization 114 occurring prior to a layout instance 116, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the optimization 114 operation includes a rebuffering 115 operation. The rebuffering 115 operation includes generating and evaluating multiple rebuffering candidates to replace an initial buffer tree. Rebuffering candidates are evaluated and selected using as a unified improvement scoring algorithm (e.g., a return on investment (ROI) algorithm) that indicates a measure of improvement provided by each rebuffering candidate. The scoring algorithm compares the relative benefit provided by a rebuffering candidate with the relative cost associated with the rebuffering candidate. In instances in which a rebuffering candidate has a smaller buffering cost than the initial buffer tree, conventional scoring algorithms (e.g., conventional ROI algorithms) result in a negative improvement score (e.g., a negative ROI) thereby preventing the rebuffering candidate from being selected although it may be better than other candidates. To address this issue, a modified scoring algorithm is utilized during the rebuffering 115 operation to facilitate selection of rebuffering candidate to replace an existing buffer tree that provides the maximum improvement score (e.g., a maximum ROI) regardless of whether the candidate has a lower buffering cost than the existing buffer tree thereby ensure selection of the best rebuffering candidate in terms of improving the design.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
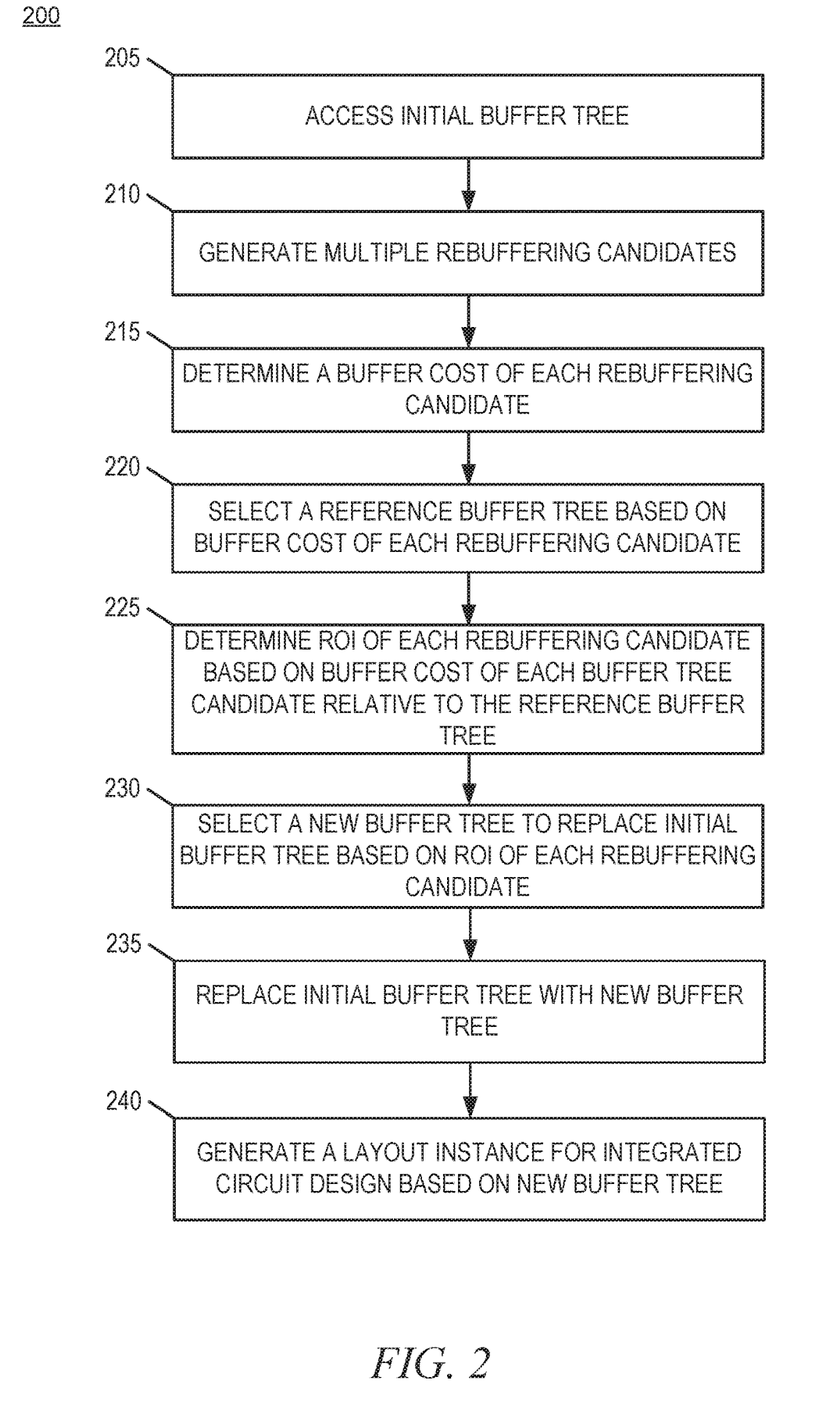
FIGS. 2-4 are flowcharts illustrating operations of a method for rebuffering an IC design using a unified improvement score calculation, according to some embodiments.
Figure 3:
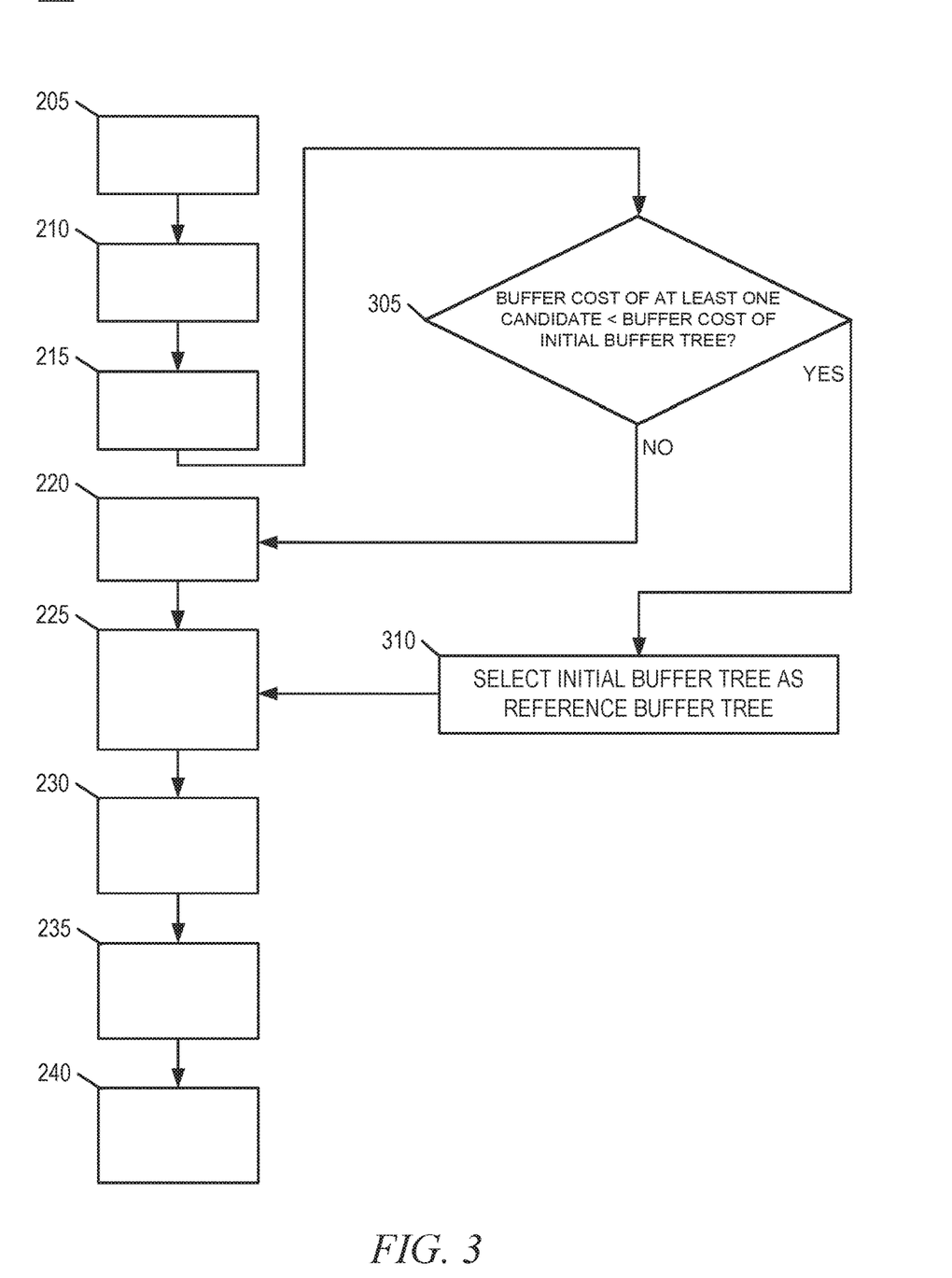
Figure 4:
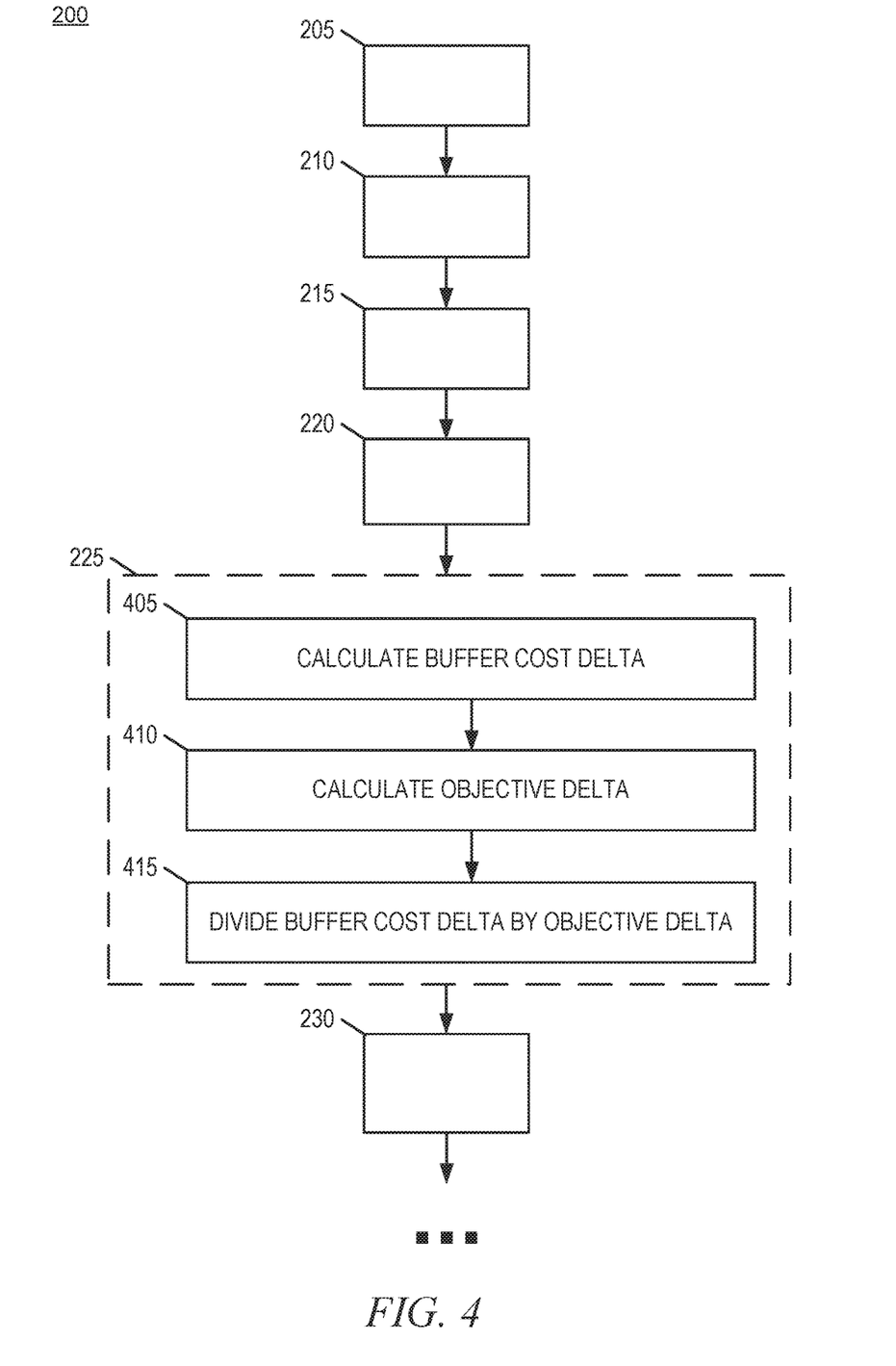

FIGS. 2-4 are flowcharts illustrating operations of a method 200 for rebuffering an IC design using a unified improvement score calculation, according to some embodiments. For some embodiments, the method 200 is performed as part of a place and route process applied to a circuit design (e.g., by an EDA system). More specifically, the method 200 can be performed as part of DRV fixing and global timing optimization stages of a place and route process.

It will be understood that the method 200 may be performed by a computing device, such as a computing device executing instructions of an EDA system. For example, the operations of a method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

At operation 205, the computing device accesses, form memory, an integrated circuit (IC) design comprising an initial buffer tree. The buffer tree comprises a buffer and a set of clock sinks connected to the buffer.

The computing device, at operation 210, generates multiple rebuffering candidates based on the initial buffer tree. Each rebuffering candidate comprises a modified buffer tree based on the initial buffer tree. In generating the multiple rebuffering candidates, the computing device may utilize one of many known algorithms for optimizing buffer insertion such as Van Ginneken's Algorithm.

For each of the rebuffering candidates, the computing device determines a buffering cost, at operation 215. The buffering cost may comprise one of: slew, timing or power, for example. Accordingly, in determining the buffering cost for a rebuffering candidate, the computing device may perform one of: determining a slew associated with the rebuffering candidate, determining a timing associated with the rebuffering candidate, or determining a power consumption associated with the rebuffering candidate.

At operation 220, the computing device selects a reference buffer tree from the multiple rebuffering candidates based on the buffering cost of each candidate. For example, the computing device may select the rebuffering candidate with the smallest buffering cost as the reference buffer tree.

Accordingly, in selecting a buffer tree from the multiple rebuffering candidates, the computing device may identify the rebuffering candidate with the smallest buffering cost.

As will be discussed in further detail below, in some embodiments, the computing device selects the reference buffer tree from the rebuffering candidates based on determining that at least one of the rebuffering candidates has a buffering cost that is smaller than a buffering cost associated with the initial buffer tree.

The computing device determines an improvement score for each rebuffering candidate based on the buffering cost of each rebuffering candidates relative to the buffering cost of the reference buffer tree (operation 225). For example, the computing device may determine an ROI for each rebuffering candidate. The computing device determines an ROI for a given rebuffering candidate based on a difference between the buffering cost associated with the rebuffering candidate and the buffering cost associated with the reference buffer tree. The difference between a buffering cost associated with a rebuffering candidate and a buffering cost associated with a reference buffer tree is referred to herein as a "buffering cost delta." Further details regarding the improvement score calculation for a rebuffering candidate are discussed below.

At operation 230, the computing device selects a new buffer tree from the rebuffering candidates to replace the initial buffer tree based on the improvement score associated with each rebuffering candidate. For example, the computing device may select the rebuffering candidate with the highest improvement score (e.g., the highest ROI) as the new buffer tree to replace the initial buffer tree. Accordingly, in selecting the new buffer tree, the computing device may identify the rebuffering candidate with the highest score and select that rebuffering candidate as the new buffer tree. The computing device replaces the initial buffer tree with the new buffer tree in the IC design, at operation 235.

The computing device, at operation 240, generates a design layout instance for the IC device design based in part on new buffer tree. The layout describes the physical layout dimensions of the IC device.

As shown in FIG. 3, the method 200 may, in some embodiments, include operations 305 and 310. Consistent with these embodiments, the operation 305 may be performed subsequent to operation 215 where the computing device determines the buffering cost for each rebuffering candidate. At operation 305, the computing device determines whether at least one rebuffering candidate has a buffering cost that is lower than a buffering cost associated with the initial buffer tree. If at least one rebuffering candidate has a buffering cost that is lower than the buffering cost of the initial buffer tree, the method 200 advances to operation 220 where the computing device selects the reference buffer tree from the rebuffering candidates. If there are no rebuffering candidates with a buffering cost that is lower than the buffering cost associated with the initial buffer tree, the computing device selects the initial buffer tree as the reference buffer tree, at operation 310, and the method continues to operation 225.

As shown in FIG. 4, the method 200 may, in some embodiments, include operations 405, 410, and 415. Consistent with these embodiments, the operations 405, 410, and 415 may be performed as part of operation 225 where the computing device determines the improvement score associated with each rebuffering candidate. The operations 405, 410, and 415 are described below with reference to a single rebuffering candidate for ease of explanation. However, it shall be appreciated that within the context of operation 225, the operations 405, 410, and 415 may be repeated for each rebuffering candidate.

At operation 405, the computing device calculates a buffering cost delta for a rebuffering candidate. The buffering cost delta comprises a difference between the buffering cost associated with the rebuffering candidate and the buffering cost associated with the reference buffer tree.

The computing device calculates, at operation 410, an objective delta for the rebuffering candidate. The object delta comprises a difference between an objective value associated with the rebuffering candidate and an objective value associated with the reference buffer tree. Accordingly, the computing device determines a first objective value associated with the rebuffering candidate, and a second objective value associated with the reference buffer tree. An object value may, for example, correspond to a total area consumed, a buffer count, a total power of inserted buffers, or a combination thereof. Thus, in determining the objective delta for the rebuffering candidate, the computing device may perform one or more of the following operations: determining a total area consumed by the rebuffering candidate, determining a buffer count for the rebuffering candidate, or determining a total power consumed by buffers inserted into the rebuffering candidate.

The computing device divides the buffering cost delta by the object delta (at operation 415) and the result is the improvement score associated with the rebuffering candidate. As an example, the following example formula is representative of the operations 405, 410, and 415:

$$ROI = \frac{\Delta \text{Objective}}{\Delta \text{Cost}} = \frac{candidateObjective - referenceObjective}{candidateBufferTreeCost - referenceBufferTreeCost}$$

Figure 5:
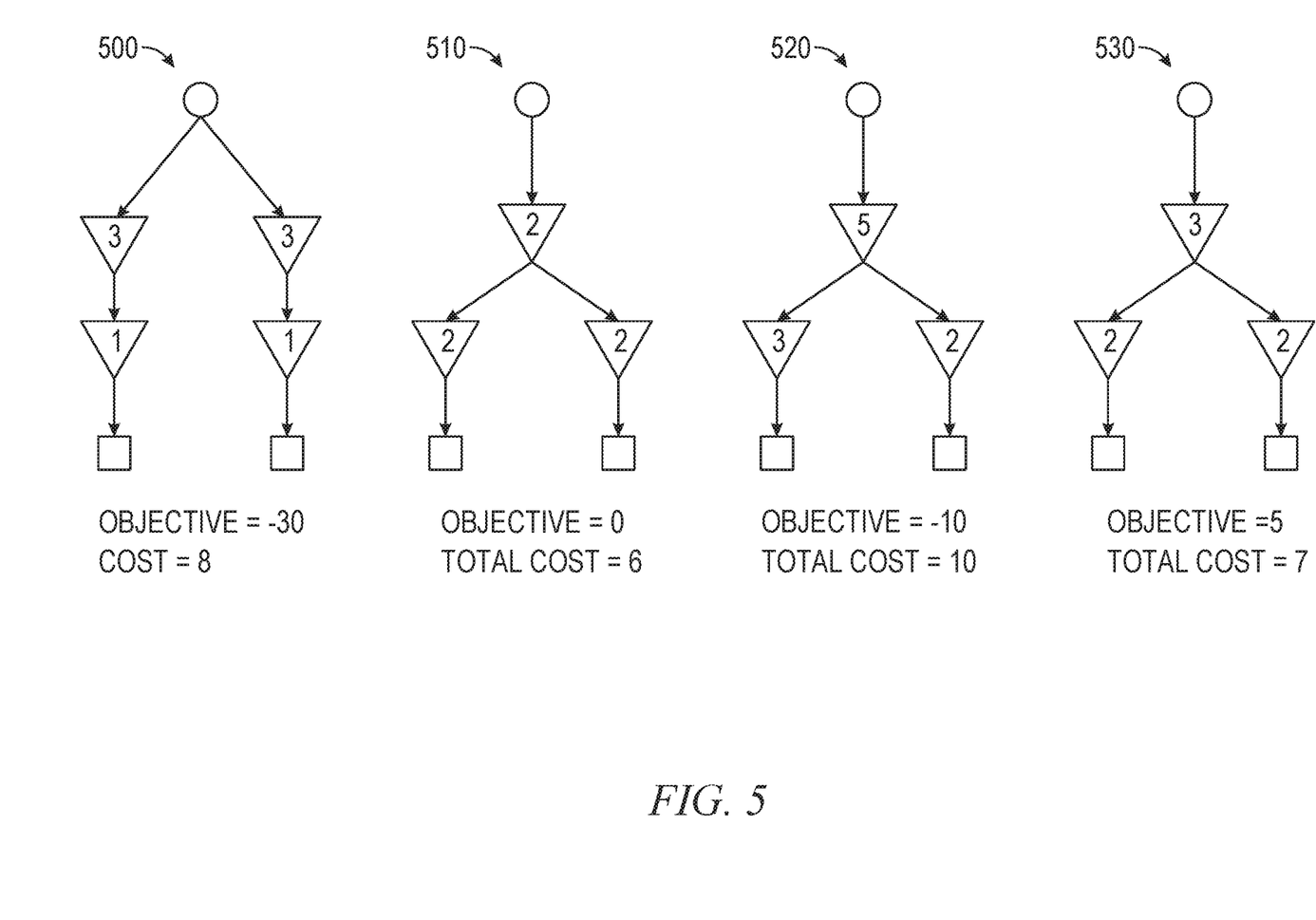
FIG. 5 is a conceptual diagramming illustrating an example rebuffering of an IC design using the unified improvement score calculation, according to some embodiments.

FIG. 5 is a conceptual diagram illustrating an example rebuffering of an IC design using the unified improvement score calculation, according to some embodiments. An initial buffer tree 500 comprising a clock source connected to a network of clock sinks is shown. The initial buffer tree 500 has an associated objective value of −30 and a buffering cost of 8.

A set of rebuffering candidates are generated based on the initial buffer tree 500. The set of rebuffering candidates comprises rebuffering candidates 510, 520, and 530. Each of the rebuffering candidates 510, 520, and 530 comprise a candidate buffer tree that may be used to replace the buffer tree 500. In this example, rebuffering candidate 510 has a buffering cost of 6 and an associated objective value of 0, rebuffering candidate 520 has a buffering cost of 10 and an associated objective value of −10, and rebuffering candidate 530 has a buffering cost of 7 and associated objective value of 5. Based on at least one of the rebuffering candidates having a buffering cost that is lower than the initial buffer tree 500, a reference buffer tree is selected from among the set of rebuffering candidates. Consistent with embodiments described above, the rebuffering candidate 510 is selected as the reference buffer tree based on the rebuffering candidate 510 having the lowest buffering cost.

With the rebuffering candidate 510 selected as the reference buffer tree, an ROI is calculated for rebuffering candidates 520 and 530. Utilizing the ROI calculation described above, the ROI for rebuffering candidate 520 is −2.5 ((−10-0)/(10-6)) and the ROI for rebuffering candidate 530 is 5 ((5-0)/(7-6)). In this example, the rebuffering candidate 530 has the highest positive ROI and thus, rebuffering candidate 530 is selected to replace the initial buffer tree 500.

Figure 6:
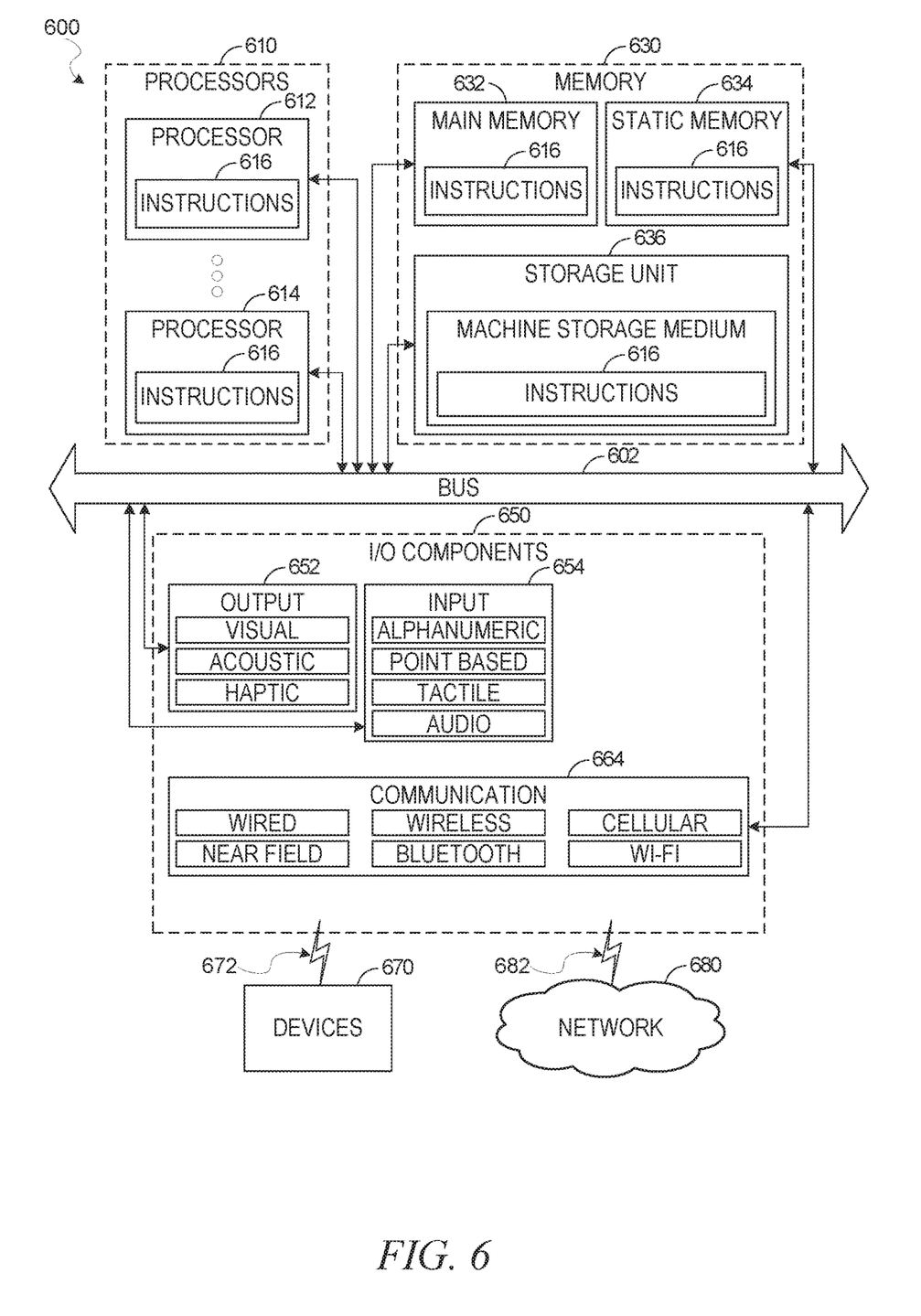
FIG. 6 is a diagrammatic representation of a machine in the example form of a computer system within which a set of instructions for causing the machine to perform any one or more of the methodologies discussed herein may be stored and executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may correspond to EDA software that transforms the machine 600 into an EDA system that executes the method 200. Additionally, or alternatively, the instructions 616 may implement FIGS. 1 and 6. The instructions 616 transform the general, non-programmed machine 600 into a particular machine 600, such as an EDA system, programmed to carry out the described and illustrated functions in the manner described here. In alternative embodiments, the machine 600 operates as a standalone device or may be coupled (e.g., networked) to other machines.

In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, both accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)).

Executable Instructions and Machine Storage Medium

The various memories (e.g., 630, 632, 634, and/or memory of the processor(s) 610) and/or the storage unit 636 may store one or more sets of instructions and data structures (e.g., software) embodying or utilized by any one or more of the methodologies or functions described herein. These instructions, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A electronic design automation (EDA) system comprising:
   one or more processors of a machine; and
   a computer-storage medium storing instructions, which when executed by the machine, cause the machine to perform operations comprising:
   generating a plurality of rebuffering candidates based on an initial buffer tree in an integrated circuit (IC) design, a rebuffering candidate in the plurality of rebuffering candidates comprising a modified buffer tree based on the initial buffer tree;
   determining a buffering cost of each rebuffering candidate;
   selecting a reference buffer tree from among the rebuffering candidates based on the buffering cost of each rebuffering candidate;
   determining an improvement score of each rebuffering candidate based on the buffering cost of each rebuffering candidate, the determining of the improvement score of each rebuffering candidate comprising determining an improvement score of the rebuffering candidate based on a buffering cost delta determined based on a difference between the buffering cost of the rebuffering candidate and a buffering cost of the reference buffer tree; and
   selecting a new buffer tree from among the plurality of rebuffering candidates to replace the initial buffer tree based on the improvement score of each rebuffering candidate; and
   generating a layout instance based on the new buffer tree.

2. The EDA system of claim 1, wherein the operations further comprise:
   determining that at least one of the plurality of rebuffering candidates has a smaller buffering cost than the initial buffer tree,
   wherein the selecting of the reference buffer tree is based on determining that at least one of the plurality of rebuffering candidates has a smaller buffering cost than the initial buffer tree.

3. The EDA system of claim 1, wherein the selecting of the reference buffer tree comprises identifying the lowest buffering cost among the plurality of rebuffering candidates.

4. The EDA system of claim 1, wherein the selecting the new buffer tree to replace the initial buffer tree comprises identifying the highest improvement score among the plurality of rebuffering candidates.

5. The EDA system of claim 1, wherein the determining of the improvement score of the rebuffering candidate comprises:
   determining an objective delta based on a difference between a first objective value corresponding to the rebuffering candidate and a second objective value corresponding to the reference buffer tree; and
   dividing the objective delta by the cost delta.

6. The EDA system of claim 5, wherein the first and second objective values correspond to one of: a total area consumed, a buffer count, or a total power consumed by inserted buffers.

7. The EDA system of claim 1, wherein determining the buffering cost of each rebuffering candidate comprises one of:
   determining a slew of each rebuffering candidate;
   determining a timing of each rebuffering candidate; or
   determining a power consumption of each rebuffering candidate.

8. The EDA system of claim 1, wherein the selecting of the new buffer tree to replace the initial buffer tree comprises selecting the reference buffer tree as the new buffer tree based on the improvement score of each rebuffering candidate being negative.

9. A method for electronic design automation, the method comprising:
   accessing, from a database, an initial buffer tree of an integrated circuit (IC) design;
   generating a plurality of rebuffering candidates based on the initial buffer tree, a rebuffering candidate in the plurality of rebuffering candidates comprising a modified buffer tree based on the initial buffer tree;
   selecting a reference buffer tree from among the rebuffering candidates based on a buffering cost associated with each rebuffering candidate;
   determining an improvement score of each rebuffering candidate based on the buffering cost of each rebuffering candidate, the determining of the improvement score of each rebuffering candidate comprising determining an improvement score of the rebuffering candidate based on a buffering cost delta determined based on a difference between the buffering cost of the rebuffering candidate and a buffering cost of the reference buffer tree; and
   selecting a new buffer tree from among the plurality of rebuffering candidates to replace the initial buffer tree based on the improvement score of each rebuffering candidate; and
   replacing the initial buffer tree with the new buffer tree in the IC design based on the improvement score of each rebuffering candidate.

10. The method of claim 9, wherein:
    determining that at least one of the plurality of rebuffering candidates has a smaller buffering cost than the initial buffer tree,
    wherein the selecting of the first rebuffering candidate is based on determining that at least one of the plurality of rebuffering candidates has a smaller buffering cost than the initial buffer tree.

11. The method of claim 9, wherein the selecting of the reference buffer tree comprises identifying the lowest buffering cost among the plurality of rebuffering candidates.

12. The method of claim 9, wherein the selecting the new buffer tree to replace the initial buffer tree comprises identifying the highest improvement score among the plurality of rebuffering candidates.

13. The method of claim 9, wherein the determining of the improvement score of the rebuffering candidate comprises:
    determining an objective delta based on a difference between a first objective value corresponding to the rebuffering candidate and a second objective value corresponding to the reference buffer tree; and dividing the objective delta by the cost delta.

14. The method of claim 13, wherein the first and second objective values correspond to one of: a total area consumed, a buffer count, or a total power consumed by inserted buffers.

15. The method of claim 9, wherein determining the buffering cost of each rebuffering candidate comprises one of:

determining a slew of each rebuffering candidate;
determining a timing of each rebuffering candidate; or
determining a power consumption of each rebuffering candidate.

16. The method of claim 9, wherein the selecting of the new buffer tree to replace the initial buffer tree comprises selecting the reference buffer tree as the new buffer tree based on the improvement score of each rebuffering candidate being negative.

17. The method of claim 9, further comprising:

generating a layout instance based on the new buffer tree.

18. A computer-storage medium storing instructions, which when executed by a machine, cause the machine to perform operations comprising:

generating a plurality of rebuffering candidates based on an initial buffer tree in an integrated circuit (IC) design, a rebuffering candidate in the plurality of rebuffering candidates comprising a modified buffer tree based on the initial buffer tree;

selecting a reference buffer tree from among the rebuffering candidates based on a buffering cost associated with each rebuffering candidate;

determining an improvement score of each rebuffering candidate based on the buffering cost of each rebuffering candidate relative to the reference buffer tree; and replacing the initial buffer tree with a new buffer tree from among the plurality of rebuffering candidates based on the improvement score of each rebuffering candidate.

19. The computer-storage medium of claim 18, wherein the selecting of the reference buffer tree is based on determining that at least one of the plurality of rebuffering candidates has a smaller buffering cost than the initial buffer tree.

20. The computer-storage medium of claim 18, wherein the operations further comprise selecting the reference buffer tree as the new buffer tree based on the improvement score of each rebuffering candidate being negative.

* * * * *